(12) United States Patent
Dwivedi et al.

(10) Patent No.: US 6,394,244 B1
(45) Date of Patent: May 28, 2002

(54) MAGNETIC POWDER CLUTCH

(75) Inventors: Vivek Dwivedi, Westland; Guntis V. Strikis, Belleville; John M. Ginder, Plymouth; Larry D. Elie, Ypsilanti; Shane A. Harte, Farmington Hills; Kanwal Bhatia, Troy, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/606,296

(22) Filed: Jun. 29, 2000

Related U.S. Application Data (63) Continuation-in-part of application No. 09/474,623, filed on Dec. 29, 1999, now Pat. No. 6,290,043.

(51) Int. Cl.[7] ............................................. F16D 37/02
(52) U.S. Cl. ......................................................... 192/21.5
(58) Field of Search ............................... 192/21.5, 58.2, 192/84.1

(56) References Cited

U.S. PATENT DOCUMENTS

| | | | |
|---|---|---|---|
| 2,709,507 A | * | 5/1955 | Trickey ..................... 192/21.5 |
| 4,376,476 A | | 3/1983 | Hagiri |
| 4,509,091 A | | 4/1985 | Booth |
| 4,567,975 A | | 2/1986 | Roll |
| 4,749,073 A | | 6/1988 | Olsen |
| 5,094,333 A | | 3/1992 | Mimura |
| 5,219,273 A | | 6/1993 | Chang |
| 5,379,217 A | | 1/1995 | Mimura |
| 5,469,947 A | * | 11/1995 | Anzai et al. ............... 192/21.5 |
| 5,598,908 A | * | 2/1997 | York et al. ................. 192/21.5 |
| 5,628,390 A | | 5/1997 | Richardson et al. |

FOREIGN PATENT DOCUMENTS

| | | | | |
|---|---|---|---|---|
| JP | 54-36440 A | * | 3/1979 | ................ 192/21.5 |

* cited by examiner

Primary Examiner—Richard M. Lorence
(74) Attorney, Agent, or Firm—Larry I. Shelton (57) ABSTRACT

An electromagnetic clutch (110) for an air conditioning compressor includes a generally cylindrical pulley (111) rotatably mounted on a comressor housing (116) and having an annular friction surface (120a, 120b) in a cavity (120). A driven member (112) is mounted on a compressor shaft (113) and has a leg (118, 119) with an annular friction surface (118a, 118b, 119a, 119b) positioned radially adjacent the cavity friction surface to form an annular space (120c, 120f) therebetween. A quantity of flowable magnetic material (127) is provided in the annular space and a magnetic coil (124) is fixed on the housing adjacent thereto. When electrical power is applied to the magnetic coil (124), magnetic flux is generated in the annular space (120c, 120f) polarizing the magnetic material and frictionally coupling the friction surfaces to cause the pulley (111) to rotate the driven member (112). A divider (123) can be positioned between the legs (118, 119) to provide additional annular spaces (120d, 120e) for the magnetic material (127).

20 Claims, 6 Drawing Sheets

MAGNETIC POWDER CLUTCH

CROSS-REFERENCE TO RELATED APPLICATION

This application is a continuation-in-part of U.S. patent application Ser. No. 09/474,623 filed Dec. 29, 1999 now U.S. Pat. No. 6,290,043.

BACKGROUND OF THE INVENTION

1. Technical Field

This invention relates to the field of clutches for selectively coupling a deriving member to a driven member. More particularly, the invention pertains to such a clutch having soft start characteristics for use with a vehicle air conditioning compressor.

2. Description of the Prior Art

A compressor for an air conditioning system of an automobile typically includes a clutch to enable disengagement of the compressor during periods in which no air conditioning is desired. During demand situations, the clutch is engaged so that the compressor compresses the refrigerant in a known manner. Prior art clutches typically are of an electromagnetic friction clutch construction. A compressor typically is driven by a V-groove pulley assembly supported by a bearing pressed onto the body of the compressor. The pulley is driven by the automotive accessory drive belt.

Prior art clutches typically include an armature affixed to the splined shaft of the compressor via a bolt. A stationary wire coil assembly is press-fit to the compressor housing. The armature is normally separated by a small air gap from the pulley face by a spring mechanism, so that the clutch is normally disengaged. Automotive voltage, normally having a nominal value of 14.4 volts, is applied to the coil to engage the clutch. Upon application of this voltage, the current in the coil increases from zero on a time scale related to the inductive time constant of the clutch, typically 150 milliseconds. The current induces magnetic flux to flow in the pulley, across the air gap, and into the armature. When the magnetic flux density reaches a critical level, the attractive force between the armature and the pulley becomes large enough to overcome the spring force holding the armature away from the pulley. The armature is then rapidly drawn into contact with the pulley, suddenly initiating torque transfer to the compressor and causing the compressor shaft to begin to rotate. When the shaft speed matches the pulley speed, the torque then reaches a steady-state level that is a function of pulley speed, cooling demand, and other vehicle operational characteristics.

When such a prior art clutch is engaged, undesirable effects can occur, including stumble, surge, and noise generation. Stumble is a longitudinal vehicle vibration induced by the sudden change in engine torque demand upon compressor engagement and surge is similar vibration upon disengagement. Noise is generated as the armature of the electromagnetic friction clutch is rapidly driven into contact with the clutch pulley during engagement. These effects of rapid compressor engagement are objectionalbe to the vehicle occupants and may contribute to premature failure of compressor components. Previous efforts to overcome these concerns include using passive mechanical means, such as mating slots or other structures provided in the pulley and armature, which are said to reduce the rate of increase of magnetic force. An example of this is illustrated in U.S. Pat. No. 4,749,073 to Olden.

Another attempt to reduce these concerns includes the insertion of an elastomeric coupling between the armature and compressor shaft to damp transients encountered during engagement and operation, as shown in U.S. Pat. No. 5,219,273 to Chang. Other attempts to reduce these concerns include electronic controls of the clutch current in an attempt to produce soft-start coupling, as described in U.S. Pat. No. 4,509,091 to Booth and U.S. Pat. No. 4,567,975 to Roll. These patents disclose a method of generating a time-varying clutch current. These methods draw the armature initially to the pulley, but allow the pulley to slip. The clutch current is increased smoothly to gradually increase the level of torque transfer and decrease the slip until a state of complete engagement is reached. These methods permit slip, which causes the electromagnetic friction clutch surfaces to become burnished over time, reducing the ability of the clutch to transfer torque.

It would therefore be desirable to provide a clutch which softens the engagement of an air conditioning compressor, but which does not cause excessive wear of the clutch friction surfaces.

SUMMARY OF THE INVENTION

Accordingly, an object of the present invention is to provide, in an air conditioning compressor a clutch having a soft start which does not experience excessive wear.

An advantage of the use of a clutch according to the present invention is that the air conditioning system will have less objectionable noise and vibration. A second advantage is that, by reducing the objectionable characteristics of such a system, one may cycle the clutch more frequently and thereby maximize fuel efficiency and optimally control the temperature of the passenger compartment.

Further advantages include having the ability to operate the compressor at high speeds. With conventional clutches, operation at high engine RPMs causes undesirable noise. With a clutch according to the present invention, the clutch may be slipped, permitting lower RPM operation for a given input speed.

The present invention concerns an electromagnetic clutch for selectively coupling a rotating driving member with a driven member to be rotated. The clutch includes a generally cylindrical driving member having an axis of rotation and an annular cavity formed therein with a cavity friction surface and a driven member having an axis of rotation coaxial with the driving member axis of rotation, the driven member having an axially extending leg positioned in the cavity with a leg friction surface positioned radially adjacent the cavity friction surface to form an annular space therebetween. A quantity of flowable magnetic material provided in the annular space and a magnetic coil is positioned adjacent the annular space and spaced axially from the cavity. When the driving member and the driven member are mounted for rotation such that the driving member can be rotated without rotating the driven member, and when electrical power is supplied to the magnetic coil, magnetic flux is created in the annular space polarizing the magnetic material and frictionally coupling the friction surfaces to cause the driven member to rotate with the driving member.

DESCRIPTION OF THE PREFERRED EMBODIMENTS

Figure 1:
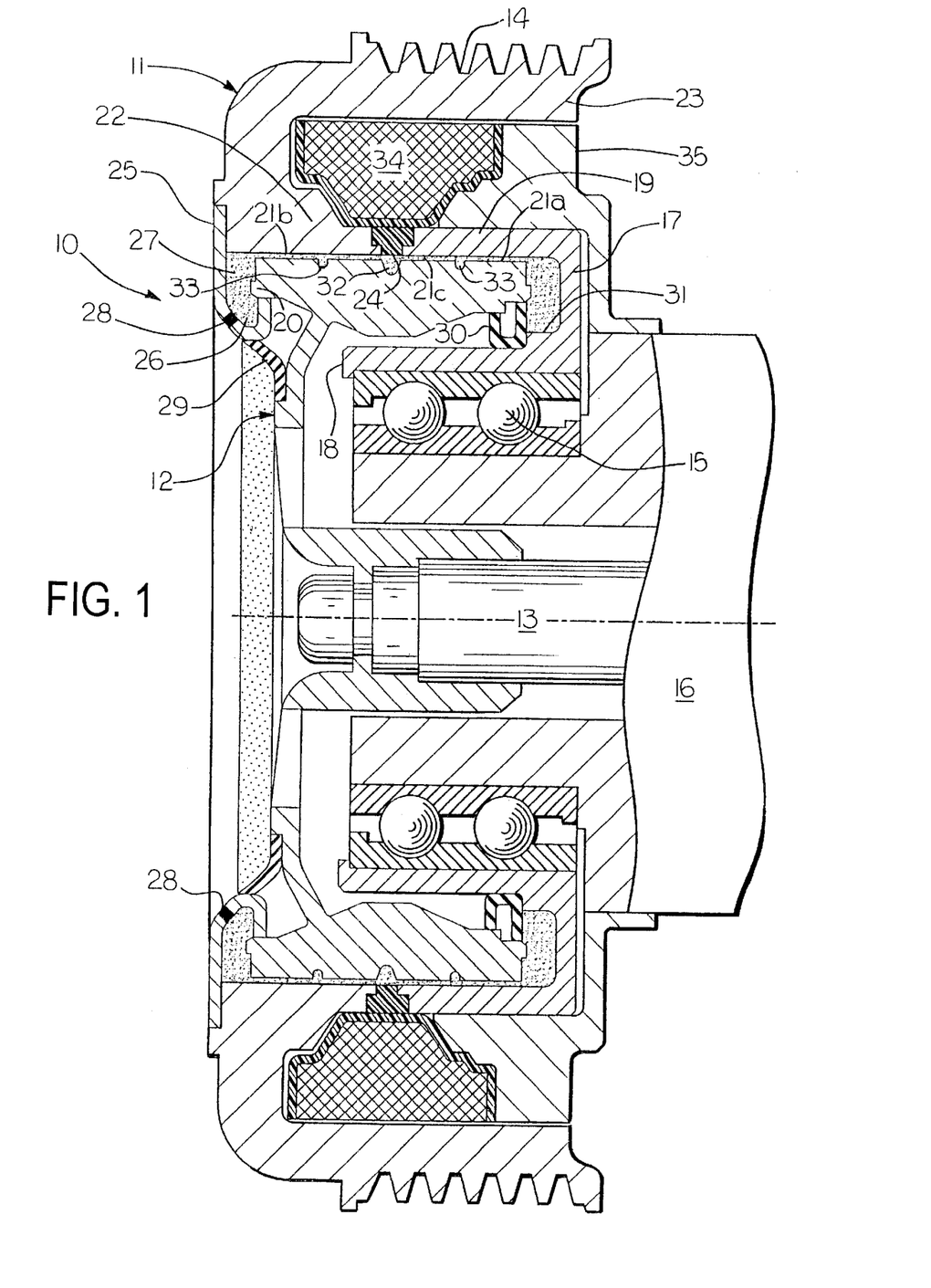
FIG. 1 is a cross sectional view of a clutch according to the present invention.

Referring first to FIG. 1, there is shown a clutch 10 suitable for driving an air conditioning compressor (not shown) from an engine (not shown) in a motor vehicle (not shown). In FIG. 1, a front of the clutch 10 faces to the left and a rear of the clutch faces to the right toward the compressor. The clutch 10 includes a driving member 11 in the form of a pulley and a driven member 12 coupled to a shaft 13 of the compressor. The pulley 11 is driven by the vehicle engine through a belt (not shown) that engages V-grooves 14 formed in an exterior surface of the pulley in a known manner to provide rotation thereof while the vehicle engine is running. The clutch 10 allows the compressor to be selectively engaged with and disengaged from the pulley 11.

An annular bearing 15 is mounted on an axial extension of a housing 16 of the compressor. A ring shaped bearing mount 17 has an axially extending U-shaped cross section with an inner leg 18 supported on the bearing 15 and a generally parallel outer leg 19. The driven member 12 includes a peripheral flange 20 that extends axially between the legs 18 and 19 and has an axially extending circumferential annular first friction surface 21a facing the outer leg 19. The pulley 11 also is ring shaped and has an axially extending U-shaped cross section with an inner leg 22 and a generally parallel outer leg 23. The V-grooves 14 are formed on an outwardly facing surface of the outer leg 23 and the inner leg 22 extends toward the outer leg 19 of the bearing mount 17 in a common plane. The legs 19 and 22 form an annular second friction surface 21b facing the first friction surface 21a. The facing friction surfaces 21a and 21b form an annular space 21c therebetween. The facing ends of the legs 19 and 22 are spaced apart to form a gap in which a nonferrous spacer 24 is positioned. The spacer 24 couples the pulley 11 to the bearing mount 17 for co-rotation on the bearing 15.

A front cover 25 has a generally J-shaped cross section and is attached to the pulley 11 at a bottom of the inner leg 22. The cover 25 extends from the pulley 11 into contact with an outer end of the flange 20 to form an enclosed first reservoir 26 for a quantity of magnetic powder 27 disposed therein. The reservoir 26 can be filled with the magnetic powder 27 through an aperture in the cover 25 sealed with a removable plug 28. A seal 29 is attached to the driven member 12 and contacts the front cover 25 to protect the sliding seal where the cover contacts the flange 25. A generally U-shaped seal 30 is attached to the inner leg 18 of the bearing mount 17 and contacts an inner end of the flange 20 to form an enclosed second reservoir 31 for a quantity of the magnetic powder 27 disposed therein. The reservoirs 26 and 31 are in communication through the space 21c between the friction surfaces 21a and 21b. The surface 21a has an annular central groove 32 formed therein opposite the spacer 24 and a pair of narrower secondary grooves 33 formed therein on either side of the central groove.

A wire wound coil 34 is positioned between the legs 22 and 23 of the pulley 11. The coil 34 is attached to a coil mounting bracket 35 mounted on the air compressor housing 16. Thus, the coil 34 and the mounting bracket 35 remain stationary as the pulley 11 is rotated by the vehicle engine. When no current is flowing in the coil 34, the driven member 12 and the shaft 13 are not rotating. As described below, when electrical power is applied to the coil 34, a magnetic field is created with lines of force being concentrated in the air gap 21c between the surfaces 21a and 21b. The magnetic field polarizes the magnetic particles 27 such that they are attracted to one another to the point that the pulley 11 becomes coupled to the driven member 12 thereby rotating the shaft 13 and operating the compressor.

Such magnetic powders 27 are well known to one skilled in the art and are not described in great detail here. However, such powders have good magnetic properties and are resistant to corrosion and wear. A preferred embodiment utilizes 400-level stainless powders, which contain iron, chromium, and other elements at low concentration. The powder is readily flowable so as to fill the space 21c between driving and driven members and should not form an irreversible compaction. The particle size and shape are chosen to obtain these desired characteristics. Particle sizes are preferably between 1 to 100 micrometers and are spherical or spheroidal. Alternatively, irregular shapes may be desired. A dispersing agent, typically small quantities of silica, graphite, zinc oxide, or other particulate materials, are preferably added to improve the flow properties of the powder. Alternatively, one skilled in the art could provide a magnetorheological fluid (MR fluid) in the space therebetween, in which case, one must include the appropriate seals to retain the MR fluid.

The magnetic powder material 27 provides a coupling between the friction surfaces 21a and 21b when a magnetic field is applied thereto. The shear yield stress ($\tau_y$) of the material is related to the intensity of the magnetic field. Thus, when a low intensity magnetic field is so applied, the clutch 10 may be permitted to slip. The torque transfer characteristics of the clutch can be widely controlled as described below. The clutch 10 is capable of operating under slipping conditions, as is further described below.

Figure 2:
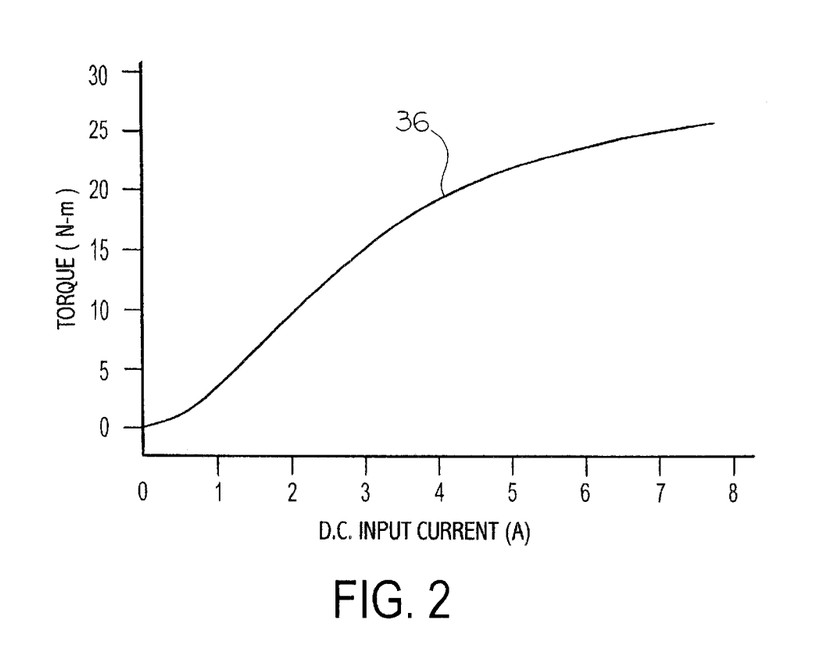
FIG. 2 is a graph illustrating the torque to current relationship in the clutch of the FIG. 1.

The magnetic field generated by the coil 34 magnetizes the powder 27 particles, causing them to attract each other, forming chains or complex structures, along the magnetic field lines that span the space 21c and link the driving and driven members mechanically in a manner known to one skilled in the art. The strength of this attractive force, and consequently the torque transfer capacity of the clutch, is a continuous (but nonlinear) function of the applied field, as shown graphically in FIG. 2 as a curve 36 of torque versus current. The torque is proportional to the magnetic field strength, and therefore to the applied D.C. input current. Output torque is controlled by varying the D.C. input current as described below.

The nonferrous spacer 24 creates a nonferrous portion of the pulley 11 at approximately the center of the coil 34. The nonferrous spacer 24 is provided to force most of the magnetic flux to flow through the powder 27 to the driven member 12 by minimizing leakage around the spacer. The spacer 24 should be strong and possess good dimensional stability and thus is preferably constructed from aluminum, brass, or nonmagnetic stainless steels. Alternatively, the spacer 24 could be omitted or replaced by ferrous metal in an application where it is determined that the device efficiency is not critical.

A variety of metals could be used in the ferrous portions of the clutch 10, including the pulley 11, the driven member 12 and the bearing mount 17. These members are preferably made from low-carbon steel such as 1008 or 1010, cast irons, 400-level stainless steels, powder-metal processed materials or any other suitable material known to one skilled in the art.

The coil 34 is preferably a multistrand copper wire coil wound around a nonferrous bobbin, or can be wound and potted as a freestanding entity (not shown). The portion of the mounting bracket 35 that is inserted into the pulley 11 is constructed of a ferrous material to enable magnetic flux to flow. In an alternative embodiment, the coil 34 can be aluminum wire.

In the preferred embodiment, the coil 34 is fixed to avoid the problems of embedding a coil in a rotating member. A rotating coil requires the use of slip rings to make the electrical connection, which are less reliable than the fixed coil illustrated in the FIG. 1.

Because the facing friction surfaces 21a and 21b are cylindrical, during rotation the magnetic powder 27 is forced outwardly against the surface 21b, thereby reducing drag of the powder 27 when the magnetic field is removed. When a magnetic field is applied, the level of torque transfer (T) of the clutch for this cylindrical arrangement is expressed approximately as:

$$T = 2\pi L R^2 \tau_Y$$

wherein "L" is the effective axial length of the friction surface 21a of the driven member 12, "R" is the radius of surface 21a from the longitudinal axis of the shaft 13, and "$\tau_Y$" is the shear yield stress of the powder 27.

The clutch 10 is engaged by energizing the coil 34. The response time of the clutch 10, until fully engaged, is dependent upon the inductive time constant of the coil 34 and other factors such as the time required for the powder to span the gap. The inductive time constant is the ratio of the coil inductance to the coil resistance, using a constant voltage. The inductive time constant may be varied between clutches by using different coil and clutch geometries, or by using different gages of wire to make the coil. The clutch 10 will engage relatively softly if the time constant is sufficiently long. Preferred examples of circuits that may be used in such an application are illustrated in FIGS. 3 through 4.

Figure 3:
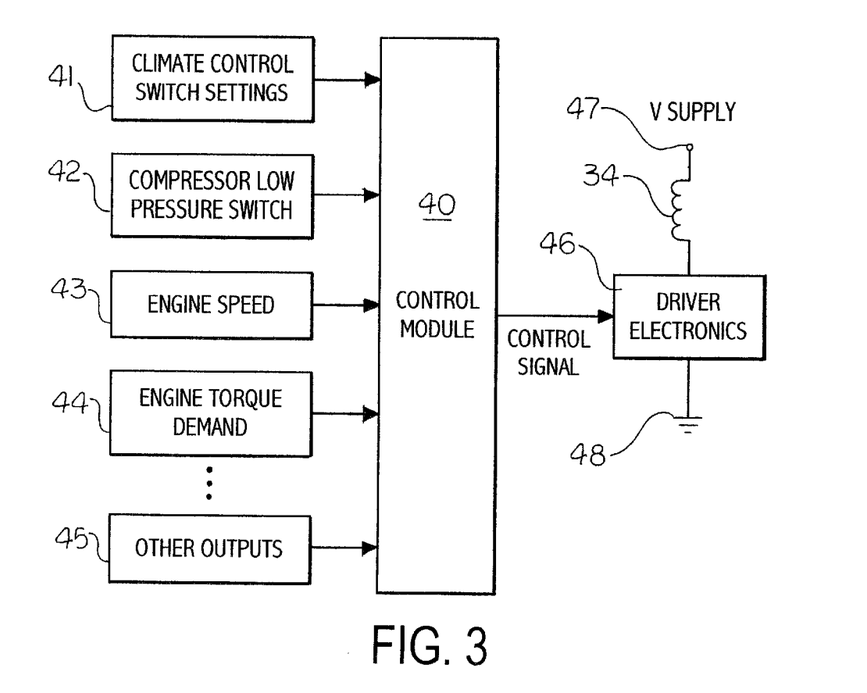
FIGS. 3 through 5 are schematic representations of electronic circuits to operate a clutch as shown in the FIG. 1.

There is shown in the FIG. 3 a schematic circuit diagram of a control circuit for the clutch 10. A control module 40 has a plurality of inputs connected to signal sources such as a "Climate Control Switch Settings" source 41, a "Compressor Low Pressure Switch" source 42, an "Engine Speed" source 43, an "Engine Torque Demand" source 44, and "Other Inputs" sources 45 to receive information relevant to the operation of the clutch 10. The control module 40 utilizes these input signals to determine when to engage the clutch 10. An output of the control module 40 is connected to an input of a driver electronics circuit 46. The circuit 46 is connected in series with the coil 34 between a power supply terminal 47 and a circuit ground potential terminal 48. The control module 40 generates a control signal to the driver electronics circuit 46 to control the flow of current through the coil 34.

Figure 4:
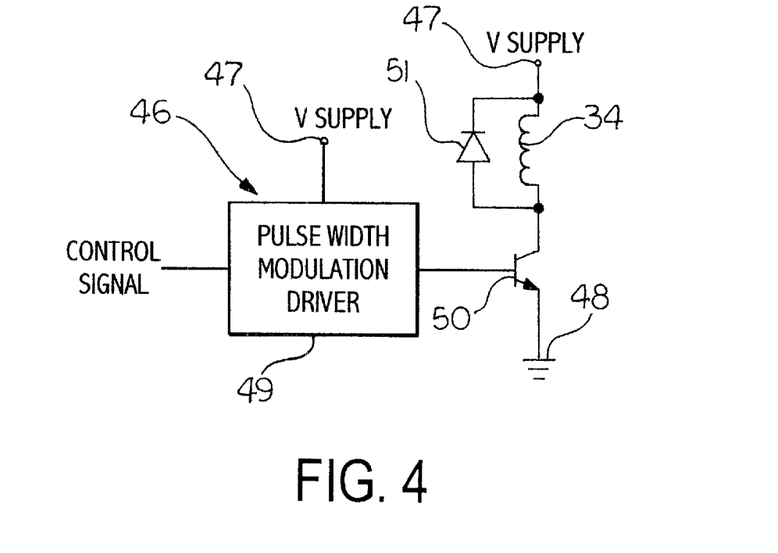

The driver electronics circuit 46 is shown in more detail in the FIG. 4. A pulse-width modulation driver 49 has an input for receiving the control signal from the control module 40, another input connected to the power supply terminal 47 and an output connected to a base of a bipolar (or FET) power transistor 50. The transistor 50 has a collector connected to the coil 34 and an emitter connected to the ground terminal 48. A diode 51 is connected in parallel with the coil 34 with an anode connected to the transistor collector and a cathode connected to the power supply terminal 47. The driver 49 generates a high fixed frequency signal of variable pulse width to turn on and off the transistor 50. The driver 49 can be programmed to gradually increase and decrease the current for engagement and disengagement of the clutch 10. The driver 49 also can respond to the control signal to reduce the current flowing in the coil to conserve electrical power during low clutch torque demand conditions.

Figure 5:
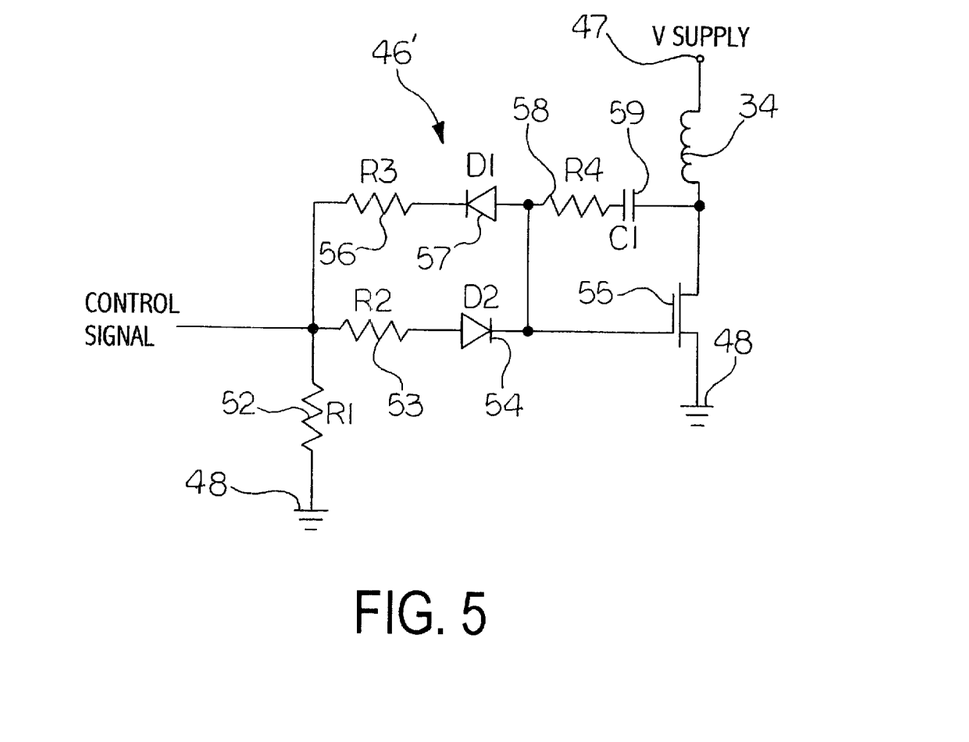

An alternate embodiment driver electronics circuit 46' is shown in the FIG. 5. The control signal line from the control module 40 is connected through a first resistor 52 to the ground terminal 48. The line is connected through a second resistor 53 to an anode of a first diode 54. The first diode 54 has a cathode connected to a gate of a FET power transistor 55. The line is further connected through a third resistor 56 to a cathode of a second diode 57. The second diode 57 has an anode connected to the cathode of the first diode 54. The anode of the second diode 57 also is connected through a fourth resistor 58 to one side of a capacitor 59. Another side of the capacitor 59 is connected through the coil 34 to the power supply terminal 47. The transistor 55 is connected between the ground terminal 48 and the junction of the coil 34 and the capacitor 59. The circuit 46' is responsive to the control signal to generate a ramp signal increase and decrease in coil voltage for clutch engagement and disengagement. The turn-on characteristic time is controlled by the product of the value of the second resistor 53 and the value of the capacitor 59, while the turn-off characteristic time is controlled by the product of the value of the third resistor 56 and the value of the capacitor 59.

The control circuits shown in the FIGS. 3–5 control the torque transfer capacity of the magnetic powder clutch 10. These control means enable the clutch 10 to be softly engaged and disengaged to minimize or eliminate the generation of stumble and noise. The torque capacity of the clutch 10 is a function of the instantaneous value of the current in the coil 34. The rise and fall times for the torque are comparable to the inductive time constant of the clutch coil 34. The inductive time constant is in general so short that if the coil 34 is excited by the stepwise application of battery voltage, the engagement and disengagement events are quite perceptible. The soft-start character of the clutch 10 is therefore preferably obtained by engaging and disengaging the clutch using a time-dependent voltage with a characteristic duration of approximately 2.5 seconds. One skilled in the art recognizes that longer duration may be desirable in various applications. Substantially shorter rise and fall times result in perceptible stumble, while times that are substantially longer may cause increased mechanical power loss due to prolonged clutch slip.

One skilled in the art appreciates that various means are available to control clutch torque capacity, and the preferred embodiments described herein are merely illustrative. A number of alternatives each involving different levels of complexity and expense are possible for soft-start operation. The above-described preferred embodiments retain the same basic mode of operation as the conventional clutch/compressor system, including an increase in the system pressure caused by vaporization of the refrigerant upon increased cooling demand, which causes a pressure switch to close, whereafter the a/c mode signal rapidly approaches the battery voltage.

Figure 6:
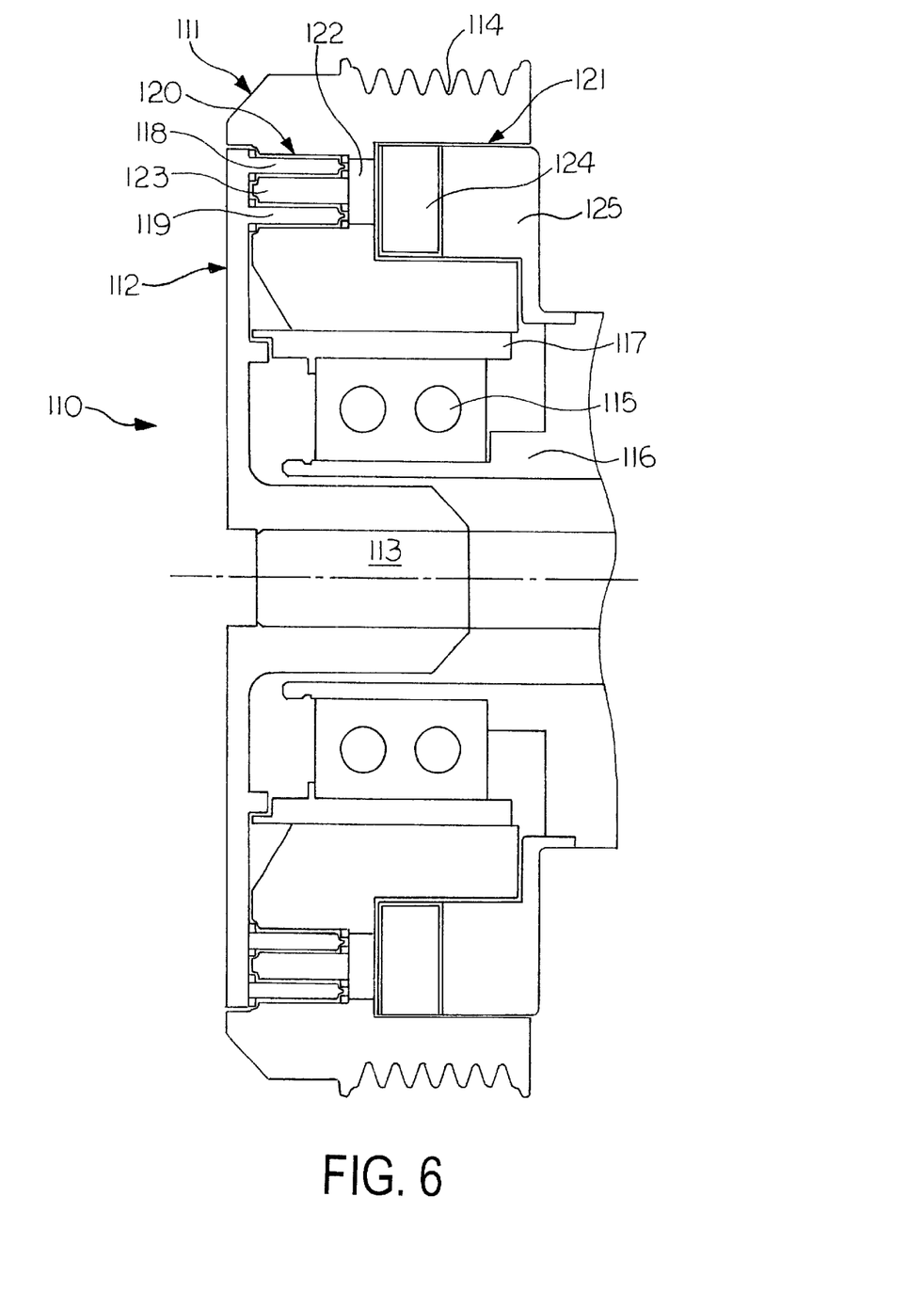
FIG. 6 is a cross sectional view of a clutch according to an alternate embodiment of the present invention.

Referring to FIG. 6, there is shown an alternate embodiment clutch 110 for driving an air conditioning compressor (not shown) from an engine (not shown) in a motor vehicle (not shown). In FIG. 6, a front of the clutch 10 faces to the left and a rear of the clutch faces to the right toward the compressor. The clutch 110 includes a driving member 111 in the form of a pulley and a driven member 112 coupled to a shaft 113 of the compressor. The pulley 111 is driven by the vehicle engine through a belt (not shown) that engages V-grooves 114 formed in an exterior surface of the pulley in a known manner to provide rotation thereof while the vehicle engine is running. The clutch 110 allows the compressor to be selectively engaged with and disengaged from the pulley 111.

An annular bearing 115 is mounted on an axial extension of a housing 116 of the compressor. A ring shaped bearing mount 117 is positioned between the bearing 115 and the encircling pulley 111 and is attached to both for rotation relative to the housing 116. The driven member 112 extends radially outwardly from the shaft 113 and has a generally planar shape. A pair of axially extending concentric legs 118 and 119 are formed adjacent a periphery of the driven member 112 and are received in a first annular cavity 120 formed in a front surface of the pulley 111.

A second annular cavity 121 is formed in a rear surface of the pulley 111 opposite the first cavity 120. A spacer 122 of non-ferrous material is positioned between the cavities 120 and 121. Attached to the spacer 122 and extending axially between the legs 118 and 119 in the first cavity 120 is a divider 122. Positioned in the second cavity 121 adjacent to the spacer 122 is a wire wound coil 124. A mounting bracket 125 is attached to the compressor housing 116 and supports the coil 124 in the second cavity 121. The coil 124 can be operated by the circuit shown in FIG. 3.

Figure 7:
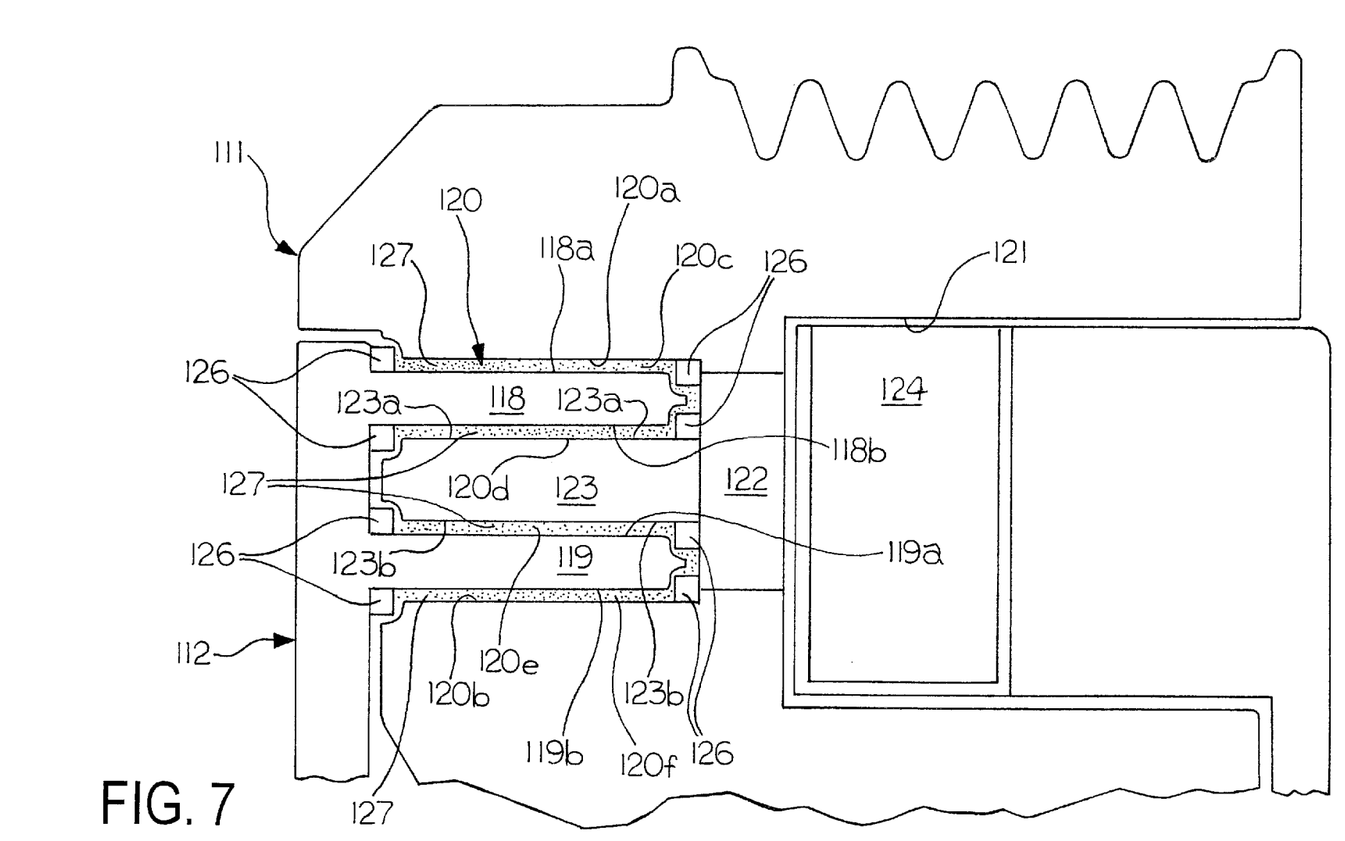
FIG. 7 is an enlarged fragmentary view of the magnetic coupling portion of the clutch shown in FIG. 6.

The first cavity 120 and the portions of the clutch 10 selectively coupling the driving member (pulley) 111 to the driven member 112 are shown in more detail in the FIG. 7. The terms "inner" and "outer" are used herein to refer to pairs of annular friction surfaces with the "outer" surface being positioned radially outwardly of the "inner" surface. For example, the leg 118 has an outer first surface 118a and an opposite inner second surface 118b which surfaces are concentric. The outer surface 118a faces an outer first surface 120a of the cavity 120 and is spaced therefrom to form a first annular space 120c. The inner surface 118b faces an outer first surface 123a of the divider 123 and is spaced therefrom to form a second annular space 120d. The leg 119 has an outer first surface 119a and an opposite inner second surface 119b which surfaces are concentric. The outer surface 119a faces an inner second surface 123b of the divider 123 and is spaced therefrom to form a third annular space 120e. The inner surface 11b faces an inner second surface 120b of the cavity 120 and is spaced therefrom to form a fourth annular space 120f. Thus, each of the annular spaces 120c through 120f is bounded by an opposed pair of the friction surfaces.

Each of the annular spaces 120c through 120f is sealed at opposite ends by a pair of circumferential labyrinth seals 126. The annular spaces 120c through 120f each have a quantity of magnetic powder 127 disposed therein and retained by the seals 126. When no current is flowing in the coil 124, the driven member 112 and the shaft 113 (FIG. 6) are no coupled for rotation by the pulley 111. When electrical power is applied to the coil 124, a magnetic field is created with lines of force being concentrated in the gaps or annular spaces 120c through 120f. The magnetic field polarizes the magnetic particles 127 such that they are attracted to one another to the point that the pulley 111 becomes coupled to the driven member 112 thereby rotating the shaft 113 and operating the compressor. The magnetic powder 127 is of the type discussed above with respect to the clutch 10.

Figure 8A:
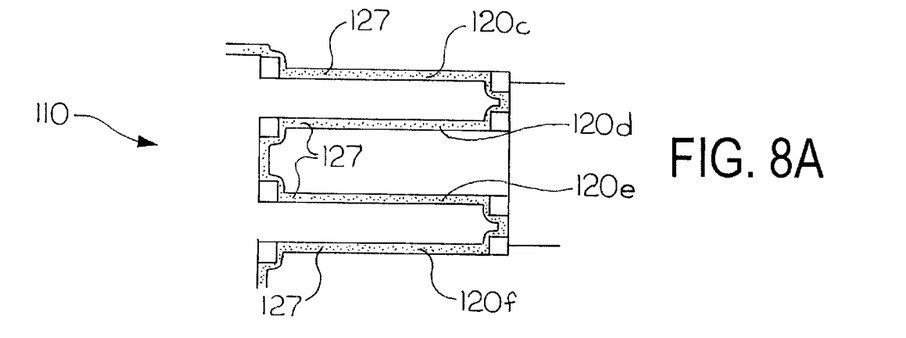
FIGS. 8a through 8d are schematic representations of various configurations of the magnetic coupling shown in FIGS. 6 and 7.
Figure 8B:
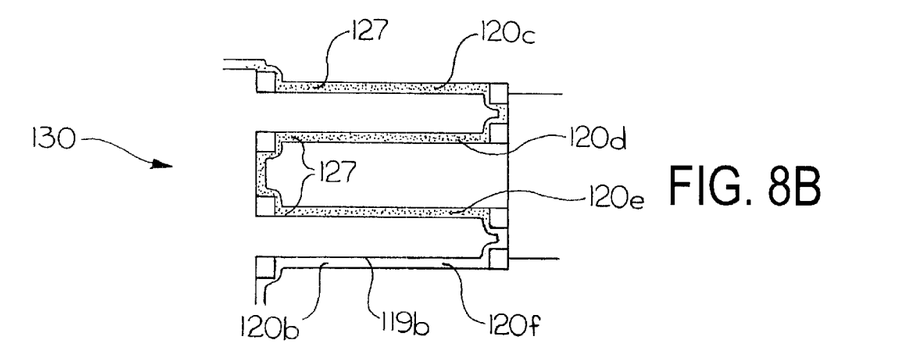

The configuration of the clutch 110 permits the selection of the number of gaps used according to the desired clutch characteristics. There is shown in the FIGS. 8a through 8d schematic representations of clutches according to the present invention having from four gaps to one gap respectively filled with the magnetic powder 127. The clutch 110 is shown in FIG. 8a as having the four annular spaces 120c through 120f filled with the magnetic powder 127. A clutch 130 is shown in FIG. 8b as having the three annular spaces 120c through 120e filled with the magnetic powder 127 and the gap 120f empty. Since the gap 120f is empty, the leg inner surface 119b and the cavity inner surface 120b could be moved closer together. Further, although the gap 120f is shown as empty, any of the other three gaps could have been selected.

Figure 8C:
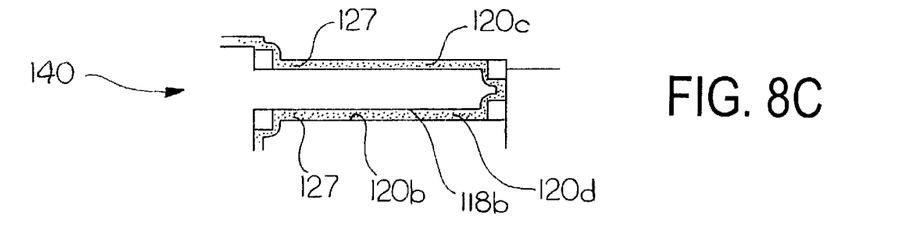
Figure 8D:
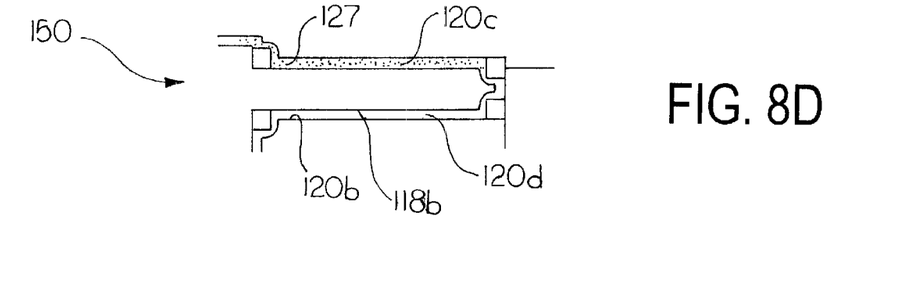

A clutch 140 is shown in FIG. 8c as having the two gaps 120c and 120d filled with the magnetic powder 127. Either the gaps 120e and 120f are not filled, or they can be eliminated along with the leg 119 such that the leg inner wall 118b faces the cavity inner wall 120b. A clutch 150 is shown in FIG. 8d as having only the gap 120c filled with the magnetic powder 127. Since the gap 120d is empty, the leg inner surface 118b and the cavity inner surface 120b could be moved closer together.

The multiple gaps filled with the magnetic powder have the advantage of increased torque capacity over the single gap shown in FIG. 1 or FIG. 8d. Each additional gap adds a pair of the friction surfaces for coupling. Although the clutch 110 is shown as having four gaps, more gaps can be provided by adding legs and dividers to the driven member 112. The clutch 110 shown in FIG. 6 also is magnetically more efficient than the clutch 10 shown in the FIG. 1 such that it can be operated at a lower current to generate the same amount of flux.

The form of the invention shown and described herein constitutes preferred embodiments of the invention; it is not intended to illustrate all possible forms thereof. The words used are words of description rather than of limitation, and various changes may be made from that which is described here without departing from the spirit and scope of the invention.

What is claimed is:

1. An electromagnetic clutch for selectively coupling a rotating driving member with a driven member to be rotated, the clutch comprising:

a generally cylindrical driving member having an axis of rotation and an annular cavity formed therein with a plurality of cavity friction surfaces;

a driven member having an axis of rotation coaxial with the axis of rotation of said driving member, said driven member having at least one axially extending leg positioned in the cavity of said driving member, the leg having a plurality of leg friction surfaces positioned radially adjacent the cavity friction surfaces to form a plurality of annular spaces therebetween;

a quantity of flowable magnetic material provided in at least one of the annular spaces, and at least another one of the annular spaces being void of flowable magnetic material; and a magnetic coil positioned adjacent the annular spaces and spaced from the cavity of said driving member, whereby when electrical power is supplied to said magnetic coil, a magnetic flux is created in the annular spaces causing said magnetic material to polarize and frictionally couple the leg friction surfaces and the cavity friction surfaces to cause said driven member to rotate with said driving member.

2. A clutch according to claim 1 including at least two legs and at least one divider disposed between said legs in the cavity of said driving member, the divider having an inner friction surface and an outer friction surface, whereby the inner friction surface and the outer friction surface are positioned radially adjacent the leg friction surfaces of the leg of said driven member.

3. A clutch according to claim 2 wherein the at least one divider has a tapered end.

4. A clutch according to claim 3 wherein each of the legs has a tapered end.

5. A clutch according to claim 1 wherein the annular spaces have two open ends with a labyrinth seal disposed in each of the open ends.

6. A clutch according to claim 1 wherein said magnetic material comprises a magnetorheological fluid.

7. A clutch according to claim 1 wherein said magnetic material comprises a magnetic powder.

8. A clutch according to claim 1 wherein said driving member has front surface and an opposed rear surface, wherein the annular cavity is formed in the front surface and a second annular cavity is formed in the rear surface, said magnetic coil being positioned in the second annular cavity.

9. A clutch according to claim 1 including a non-ferrous spacer positioned between the annular cavity and said magnetic coil.

10. A clutch according to claim 1 wherein said driving member is a pulley rotatably mounted on an air conditioning compressor housing and said driven member is mounted on a drive shaft extending from the housing.

11. An electromagnetic clutch for selectively coupling a rotating driving member with a driven member to be rotated, the clutch comprising:

a generally cylindrical driving member having an axis of rotation and an annular cavity formed therein with a plurality of cavity friction surfaces;

a driven member having an axis of rotation coaxial with the axis of rotation of said driving member, said driven member having at least one axially extending leg positioned in the cavity of said driving member, the leg having a plurality of leg friction surfaces positioned radially adjacent the cavity friction surfaces to form a plurality of annular spaces therebetween, the annular spaces having two open ends;

a quantity of flowable magnetic material provided in at least one of said annular spaces;

a magnetic coil positioned adjacent the annular spaces and spaced from the cavity of said driving member, whereby when electrical power is supplied to said magnetic coil, a magnetic flux is created in the annular spaces causing said magnetic material to polarize and frictionally couple the friction leg surfaces and the cavity friction surfaces to cause said driven member to rotate with said driving member; and a labyrinth seal disposed in at least one of the open ends of the annular spaces.

12. A clutch according to claim 11 including at least two legs and at least one divider disposed between said legs in the cavity of said driving member, the divider having an inner friction surface and an outer friction surface, the leg friction surfaces being radially adjacent the cavity friction surfaces and the inner friction surface and outer friction surface of the at least one divider.

13. A clutch according to claim 12 wherein the at least one divider has a tapered end.

14. A clutch according to claim 13 wherein each of the legs has a tapered end.

15. A clutch according to claim 11 wherein said driving member is a pulley rotatably mounted on an air conditioning compressor housing and said driven member is mounted on a drive shaft extending from the housing.

16. An electromagnetic clutch for selectively coupling a rotating driving member with a driven member to be rotated, the clutch comprising:

a generally cylindrical driving member having an axis of rotation and an annular cavity formed therein with a plurality of cavity friction surfaces;

a driven member having an axis of rotation coaxial with the axis of rotation of said driving member, said driven member having a plurality of axially extending legs positioned in the cavity of said driving member, the legs having a plurality of leg friction surfaces, and at least one divider having an inner friction surface and an outer friction surface disposed in the cavity of said driving member and positioned between the legs of the driven member, the leg friction surfaces being radially adjacent the cavity friction surfaces and the inner friction surface and outer friction surface of the at least one divider to form a plurality of annular spaces;

a quantity of flowable magnetic material provided in at least one of said annular spaces, and at least another one of the annular spaces being void of flowable magnetic material; and a magnetic coil positioned adjacent the annular spaces and spaced from the cavity of said driving member, whereby when electrical power is supplied to said magnetic coil, a magnetic flux is created in the annular spaces causing said magnetic material to polarize and frictionally couple the friction leg surfaces to the cavity friction surfaces and the inner friction surface and the outer friction surface of the at least one divider to cause said driven member to rotate with said driving member.

17. A clutch according to claim 16 wherein the at least one divider has a tapered end.

18. A clutch according to claim 17 wherein each of the legs has a tapered end.

19. A clutch according to claim 16 wherein the annular spaces have two open ends with a labyrinth seal disposed in each of the open ends.

20. A clutch according to claim 16 wherein said driving member is a pulley rotatably mounted on an air conditioning compressor housing and said driven member is mounted on a drive shaft extending from the housing.

* * * * *